United States Patent
Chang

(10) Patent No.: US 9,085,266 B2
(45) Date of Patent: Jul. 21, 2015

(54) STRUCTURE OF ROOF RACK

(71) Applicant: Pu-Lun Chang, Kaohsiung (TW)

(72) Inventor: Pu-Lun Chang, Kaohsiung (TW)

(*) Notice: Subject to any disclaimer, the term of this patent is extended or adjusted under 35 U.S.C. 154(b) by 95 days.

(21) Appl. No.: 14/093,733

(22) Filed: Dec. 2, 2013

(65) Prior Publication Data

US 2015/0151686 A1 Jun. 4, 2015

(51) Int. Cl.
*B60R 9/058* (2006.01)
*B60R 9/045* (2006.01)
*B60R 9/04* (2006.01)

(52) U.S. Cl.
CPC . *B60R 9/045* (2013.01); *B60R 9/04* (2013.01); *B60R 9/058* (2013.01)

(58) Field of Classification Search
CPC ............ B60R 9/04; B60R 9/045; B60R 9/058
USPC .................. 224/315, 321, 322, 323, 325, 326
See application file for complete search history.

(56) References Cited

U.S. PATENT DOCUMENTS

| | | | | |
|---|---|---|---|---|
| 4,728,019 | A | * | 3/1988 | Olliges .......................... 224/329 |
| 5,275,320 | A | * | 1/1994 | Duemmler ..................... 224/319 |
| 5,806,735 | A | * | 9/1998 | Christiansson et al. ....... 224/322 |
| 6,273,311 | B1 | * | 8/2001 | Pedrini .......................... 224/321 |
| 6,739,487 | B2 | * | 5/2004 | Chimenti et al. .............. 224/321 |
| 8,393,508 | B2 | * | 3/2013 | Sautter et al. ................. 224/325 |
| 2013/0193177 | A1 | * | 8/2013 | Poulsen et al. ................ 224/329 |
| 2014/0224850 | A1 | * | 8/2014 | Lundgren ...................... 224/322 |

* cited by examiner

*Primary Examiner* — Gary Elkins
(74) *Attorney, Agent, or Firm* — WPAT, PC; Justin King

(57) ABSTRACT

The present invention provides a structure of a roof rack, which includes: a base, which has one side forming a first clamping section; a fixing member, which has one side forming a second clamping section, the second clamping section and the first clamping section being arranged to correspond to and movable with respect to each other for clamping purposes; a rod, which has one end coupled to the base, the rod extending through the fixing member to project out, the rod having an opposite end coupled to an extension coupler; and a roof transverse bar, which is coupled to the base and the fixing member, the roof transverse bar having at least one coupling slot.

4 Claims, 7 Drawing Sheets

STRUCTURE OF ROOF RACK

FIELD OF THE INVENTION

The present invention relates to a structure of a roof rack, and in particular to a structure of a roof rack for carrying a roof box, luggage tray, luggage carrier, a bicycle rack, a kayak holder, a snowboard rack, or a ski rack, which achieves easy attaching and detaching a roof transverse bar to/from a roof longitudinal bar by means of the rotation of a rod.

BACKGROUND OF THE INVENTION

A conventional structure of a roof rack is generally made up of a plurality of longitudinal bar and a plurality of transverse bars. The longitudinal bars are respectively mounted to and extending along opposite sides of a car roof. The transverse bars extend between and are fixed to the longitudinal bars on the two sides of the car roof. The combined arrangement of the longitudinal bars and transverse bars allows a roof box, luggage tray, luggage carrier, a bicycle rack, a kayak holder, a snowboard rack, or a ski rack to be positioned on the car roof.

Taiwan Utility Model M267119 discloses a locking structure of a roof rack structure, wherein a coupling base and a coupling board are both provided with clamping sections. The clamping section of the coupling base has a top portion in which a channel is formed. The channel functions to receive and retain a transverse bar. Formed under the channel is an insertion slot for receiving an insertion tab of the coupling board to be fit therein. A bolt is screwed through the coupling board and coupling base to allow them to be attached to a longitudinal bar by means of the clamping sections. A top end of the clamping section of the coupling board is arranged to form the insertion tab, while a bottom end comprises a threaded hole formed therein to receive the bolt to extend therethrough, whereby when the clamping sections are used to couple to the longitudinal bar, the bolt is set through and coupling base and is screwed to the coupling board to have the coupling base and the coupling board attached to the longitudinal bar. An end of the transverse bar is fit into the channel of the coupling base. Screws are then put through the coupling seat to screw into the transverse bar to have the transverse bar fixed to the longitudinal bar.

Such a known structure of a roof rack has the following disadvantages:

(1) The assembling is complicated. Bolts and screws that are different must be respectively applied to secure the longitudinal bar and the transverse bar. Such an assembling operation requires a great number of different bolts/screws to complete securing and fixing. In addition, a detaching operation is thus also complicated.

(2) The assembling or detaching operation is extremely time-consuming. Due to the complicated process of assembling, a great amount of time is necessary for attaching or detaching.

Thus, the present invention aims to provide a structure of a roof rack, which can effectively reduce the amount of time necessary for assembling and detaching and can achieve easy attaching and detaching of a roof transverse bar to a roof longitudinal bar through rotation of the bars.

SUMMARY OF THE INVENTION

An object of the present invention is to provide a structure of a roof rack, which is a roof rack structure for carrying luggage thereon and can achieve easy attaching and detaching of a roof transverse bar to a roof longitudinal bar through rotation of a rod.

To achieve the above object, the present invention provides a structure of a roof rack, which comprises: a base, which has one side forming a first clamping section, the base having an opposite side forming a position-constraining member and two channels that are symmetric with respect to each other; a fixing member, the fixing member being mounted to the base and having one side forming a second clamping section and an opposite side forming two slide blocks respectively corresponding to the channels and slidably received in the channels, the second clamping section corresponding to and movable, together with the fixing member, with respect to the first clamping section; a rod, which has one end coupled to the position-constraining member and constrained in the base, the rod extending through and projecting outside the fixing member, the rod having an opposite end forming a thread and extending through an elastic element and a nut; an extension coupler, the extension coupler comprising a bearing block, at least one movable stop block, a first stop section, and a second stop section, the bearing block having a position-constraining hole formed therein, the bearing block and the nut being fit over the end of the rod that has the thread, the position-constraining hole receiving the nut therein, the bearing block movably bearing the movable stop block, the first stop section retaining the bearing block in position, the elastic element having two ends respectively supported on the second stop section and the bearing block; and a roof transverse bar, which is coupled to the base and the fixing member, the roof transverse bar having at least one coupling slot, the coupling slot corresponding to and coupled to the extension coupler, wherein when the rod is rotated in a given direction, the rod drives the nut to rotate and the nut drives the bearing block to move, whereby the bearing block is born by the elastic element and drives the extension coupler to move and the extension coupler drives the fixing member to move in a direction toward the base, so that when the fixing member gets into contact with the base, the rotation of the rod causes the bearing block to move toward the first stop section and the bearing block compresses the elastic element and forces the movable stop block to project out of a side of the extension coupler to tightly engage the coupling slot. As such, the rotation of the rod is used to achieve easy attaching and detaching of the roof transverse bar to/from a roof longitudinal bar.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
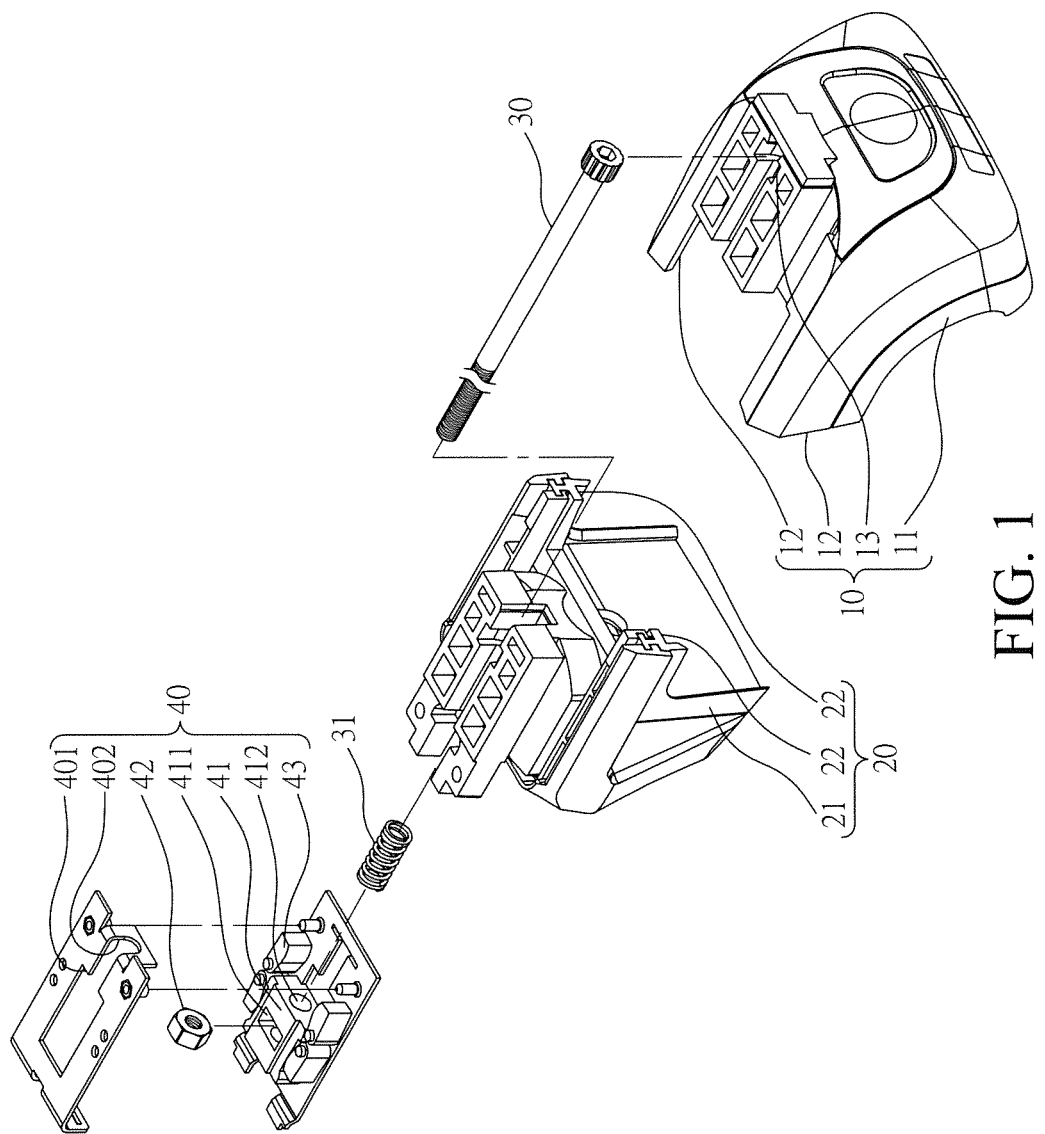
FIG. 1 is an exploded view showing the present invention.

With reference to the drawings and in particular to FIGS. 1-6, the present invention provides a structure of a roof rack, which comprises: a base 10, which has one side forming a first clamping section 11, the base 10 having an opposite side forming a position-constraining member 13 and two channels 12 that are symmetric with respect to each other; a fixing member 20, the fixing member 20 being mounted to the base 10 and having one side forming a second clamping section 21 and an opposite side forming two slide blocks 22 respectively corresponding to the channels 12 and slidably received in the channels 12, the second clamping section 21 corresponding to and movable, together with the fixing member, with respect to the first clamping section 11; a rod 30, which has one end coupled to the position-constraining member 13 and thus constrained in the base 10, the rod 30 extending through and projecting outside the fixing member 20, the rod 30 having an opposite end forming a thread and extending through an elastic element 31 and a nut 42; an extension coupler 40, the extension coupler 40 comprising a bearing block 41, at least one movable stop block 43, a first stop section 401, and a second stop section 402, the bearing block 41 having a position-constraining hole 411 formed therein, the bearing block 41 and the nut 42 being fit over the end of the rod 30 that has the thread, the position-constraining hole 411 receiving the nut 42 therein, the bearing block 41 movably bearing the movable stop block 43, the first stop section 401 retaining the bearing block 41 in position, the elastic element 31 having two ends respectively supported on the second stop section 402 and the bearing block 41; and a roof transverse bar 50, which is coupled to the base 10 and the fixing member 20, the roof transverse bar 50 having at least one coupling slot 51, the coupling slot 51 corresponding to and coupled to the extension coupler 40, wherein when the rod 30 is rotated in a given direction, the rod 30 drives the nut 42 to rotate and the nut 42 drives the bearing block 41 to move, whereby the bearing block 41 is born by the elastic element 31 and drives the extension coupler 40 to move and the extension coupler 40 drives the fixing member 20 to move in a direction toward the base 10, so that when the fixing member 20 gets into contact with the base 10, the rotation of the rod 30 causes the bearing block 41 to move further toward the first stop section 401 and the bearing block 41 compresses the elastic element 31 and forces the movable stop block 43 to project out of a side of the extension coupler 40 to tightly engage the coupling slot 51. As such, the rotation of the rod 30 is used to achieve easy attaching and detaching of the roof transverse bar 50 to/from a roof longitudinal bar 60.

Figure 2:
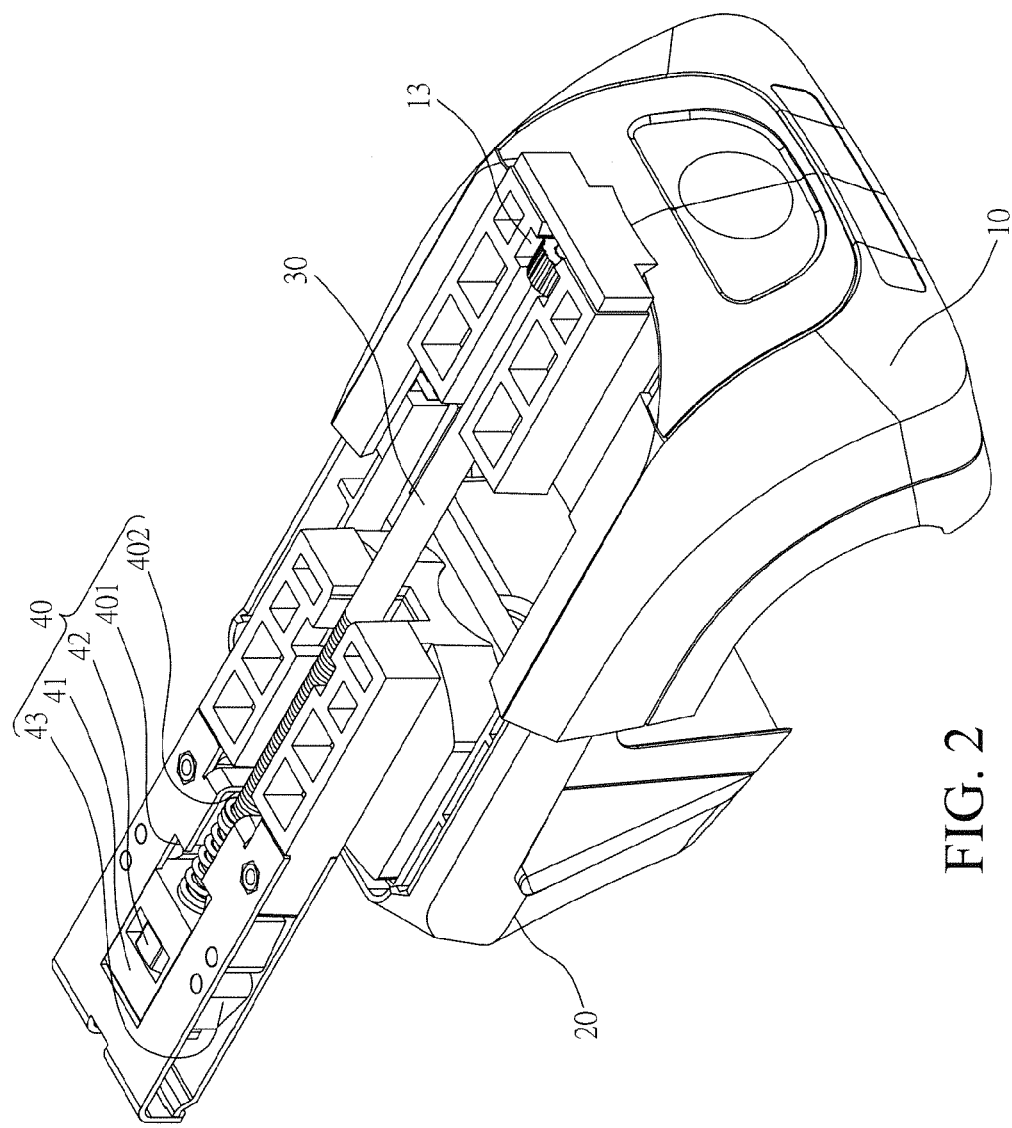
FIG. 2 is a perspective view showing the present invention in an assembled form.
Figure 3:
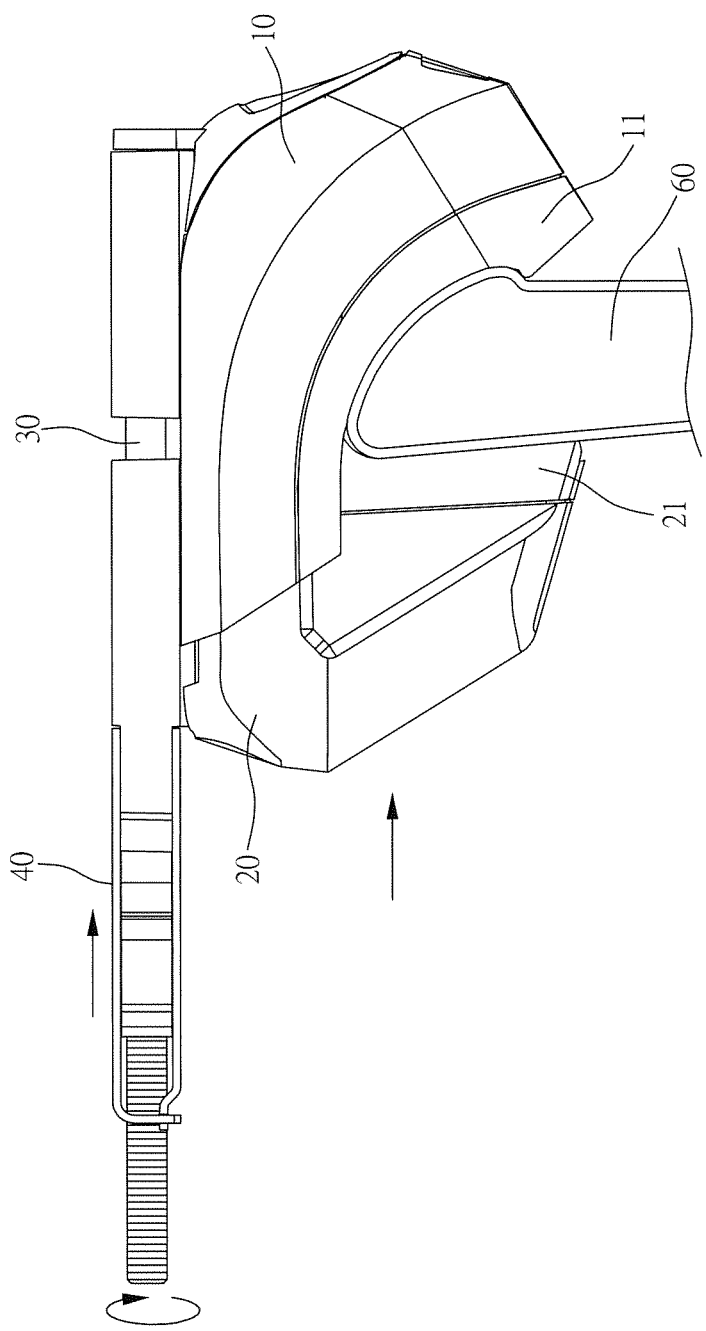
FIG. 3 is a schematic view illustrating an operation that a first clamping section and a second clamping section fasten a roof longitudinal bar according to the present invention.
Figure 4:
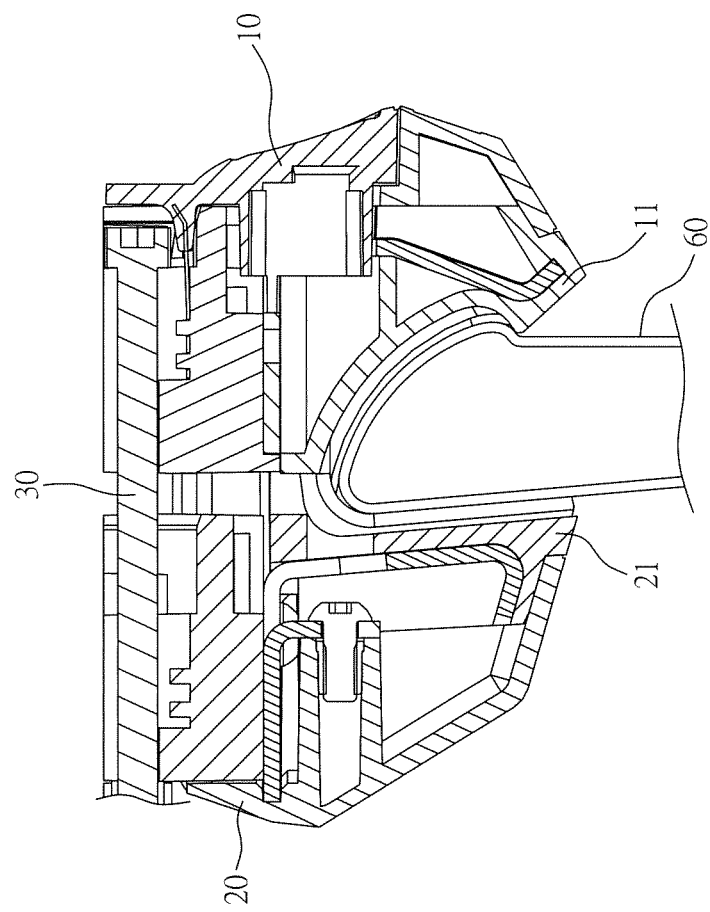
FIG. 4 is a cross-sectional view showing the first clamping section and the second clamping section fastening the roof longitudinal bar.

Referring to FIGS. 3 and 4, which are respectively a schematic view and a cross-sectional view illustrating the first clamping section and the second clamping section fastening the roof longitudinal bar, additional reference being also had to FIGS. 1-2, when the rod 30 is rotated in a given direction, the rod 30 drives the nut 42 to rotate and the nut 42 drives the bearing block 41 to move, so that the bearing block 41, being born by the elastic element 31, drives the extension coupler 40 to move and the extension coupler 40 drives the fixing member 20 to move in a direction toward the base 10, whereby when the fixing member 20 gets into contact with the base 10, the first clamping section 11 and the second clamping section 21 can clamp and fasten a roof longitudinal bar 60 therebetween. As shown in FIG. 3, when the rod 30 is rotated in for example a clockwise direction, the fixing member 20 and the base 10 are caused to approach each other so as to clamp and fasten the roof longitudinal bar 60 therebetween. Oppositely, when the rod 30 is rotated counterclockwise, the fixing member 20 and the base 10 are caused to separate from each other to thereby release the roof longitudinal bar 60.

Figure 5:
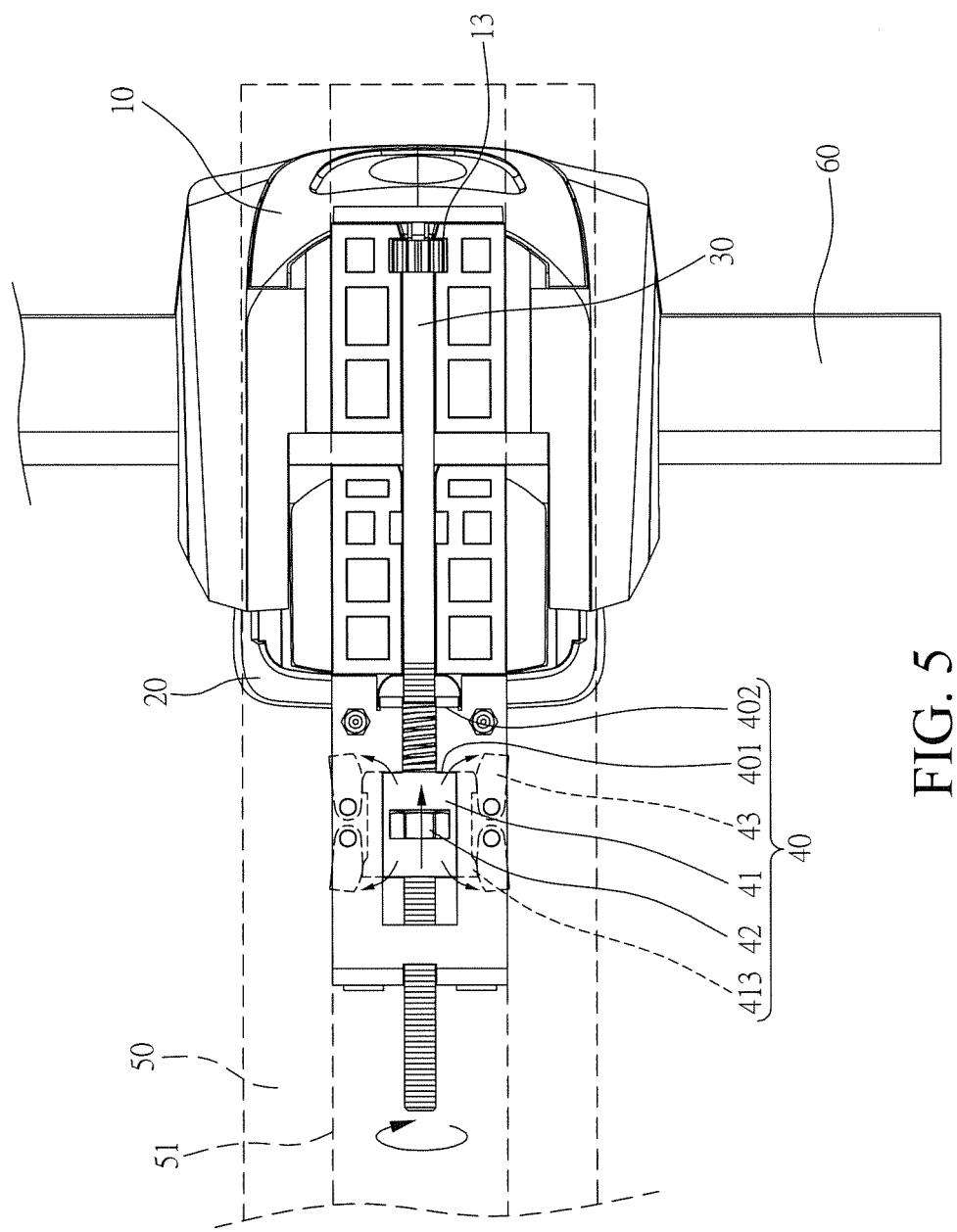
FIG. 5 is a schematic view illustrating an operation that an extension coupler fastens a roof transverse bar according to the present invention.
Figure 6:
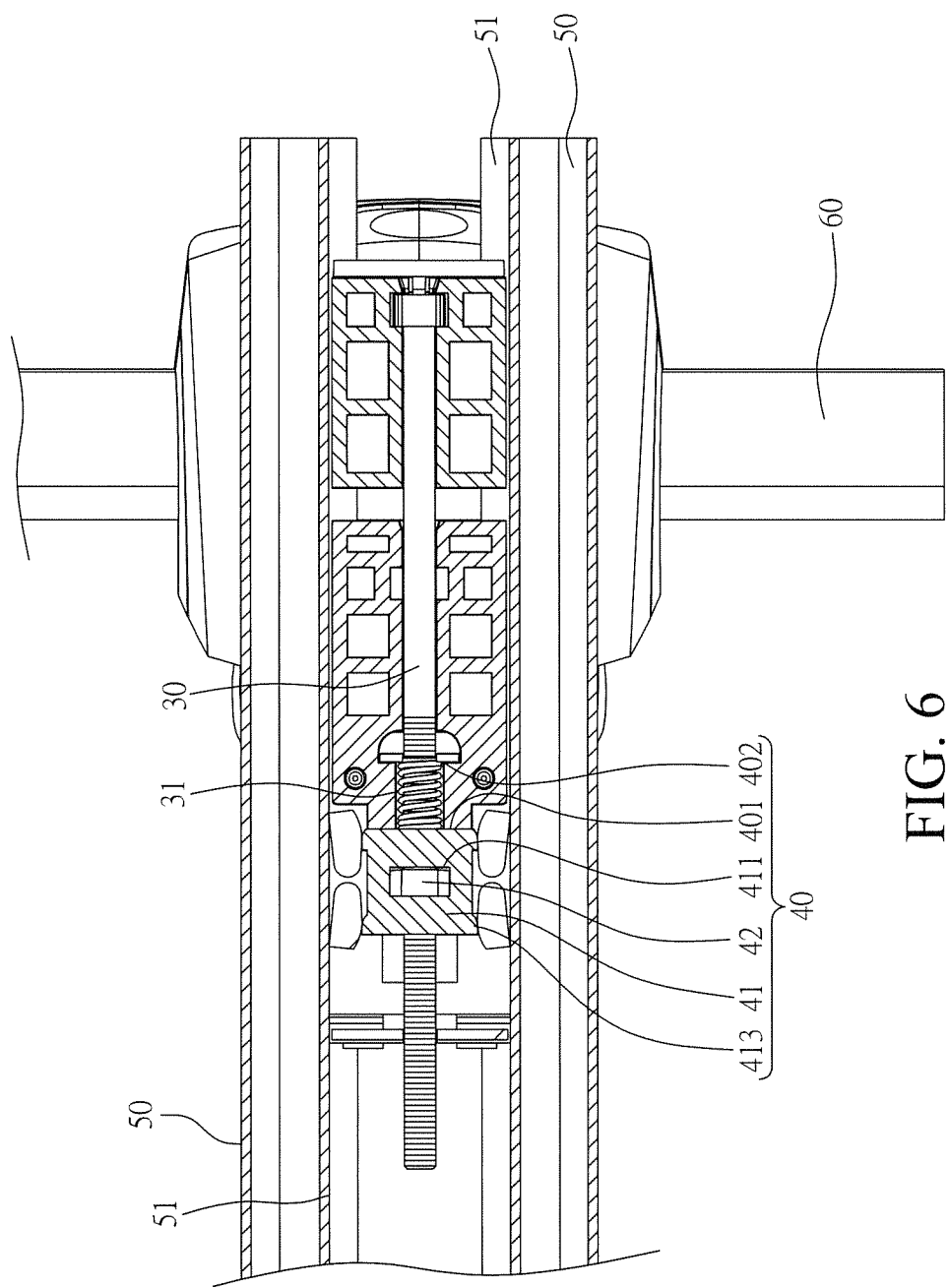
FIG. 6 is a cross-sectional view showing the extension coupler fastening the roof transverse bar according to the present invention.

Also referring to FIGS. 5 and 6, which are respectively a schematic view and a cross-sectional view showing the extension coupler fastening the roof transverse bar, additional reference being also had to FIGS. 1-4, when the fixing member 20 and the base 10 are set in contact with each other, the first clamping section 11 and the second clamping section 21 clamp and fasten the roof longitudinal bar 60 therebetween already. Further rotation of the rod 30 would cause the rod 30 to drive the nut 42 to move and the nut 42 drive the bearing block 41 to move toward the first stop section 401, so that the bearing block 41 compresses the elastic element 31 and forces the movable stop block 43 to project out of a side of the extension coupler 40 for tightly engaging and thus fastening the coupling slot 51 to achieve easy assembling and detaching, wherein the elastic element 31 is a spring and the spring receives the rod 30 to extend therethrough with two ends of the spring respectively supported on the bearing block 41 and the second stop section 402, whereby when the first clamping section 11 and the second clamping section 21 clamp and fasten the roof longitudinal bar 60, the rod 30 is allowed to take further rotation and under such a condition, the extension coupler 40 is fastened to the coupling slot 51 of the roof transverse bar 50 and further, the bearing block 41 comprises a through hole 412 and a position-constraining hole 411, the through hole 412 being fit over the rod 30, the position-constraining hole 411 receiving the nut 42 therein, the bearing block 41 having one side forming at least one rib 413, so that when the rod 30 undergoes further rotation and the bearing block 41 is moved toward the first stop section 401 and compresses the spring, the ribs 413 of the bearing block 41 is set in engagement with the movable stop block 43 to drive the movable stop block 43 to project out of the side of the extension coupler 40 to tightly engage and thus fasten the coupling slot 51, achieving an effect that the extension coupler 40 fasten and fix the roof transverse bar 50. As shown in FIGS. 5 and 6, to put the present invention into practice, in order to have the extension coupler 40 and the roof transverse bar 50 more securely coupled together, each of two opposite sides of the extension coupler 40 is provided with at least one movable stop block 43 in a symmetric manner and correspondingly, the two opposite sides of the bearing block 41 are each provided with at least one rib 413 in a symmetric manner. As such, when the bearing block 41 is moved, the ribs 413 drive the corresponding movable stop blocks 43 to project out and have the movable stop blocks 43 tightly engage and fasten the coupling slot 51 to achieve an more secured effect of coupling and fastening.

Figure 7:
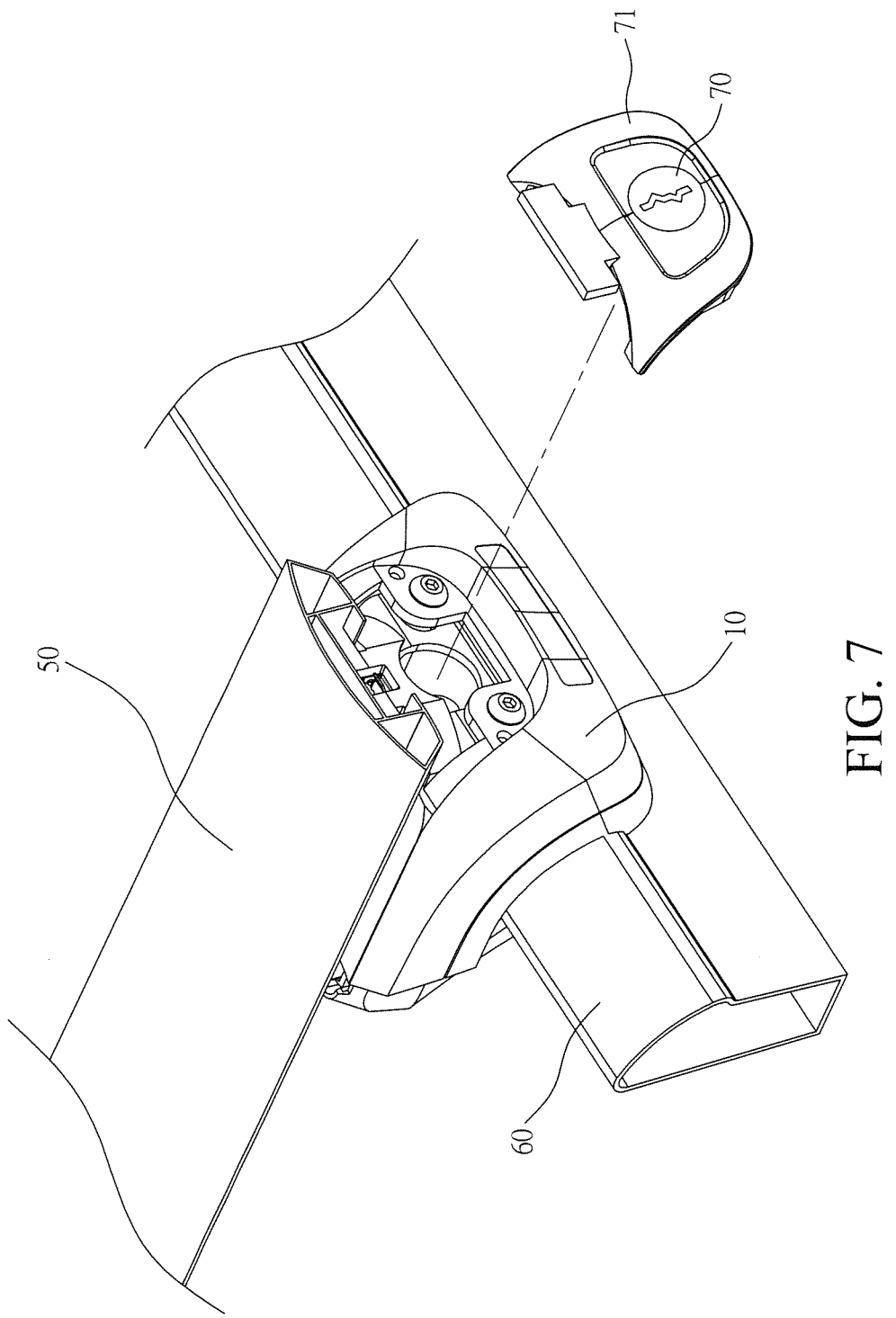
FIG. 7 is a perspective view showing the present invention combined with a lock.

Referring to FIG. 7, which is a perspective view showing the present invention combined with a lock, the base 10 is provided with a lock 70. The lock 70 is provided along an outer circumference thereof with a cover 71. The lock 70 is coupled to the base 10 in such a way that the cover 71 shields the rod 30 (also see Figure). With the protection provided by the lock 70, rotation of the rod 39 by unauthorized persons for the purposes of releasing can be prevented so as to achieve a burglary resistant effect.

The features of the present invention will be summarized as follows:

(1) When the rod according to the present invention is rotated in the given direction, the extension coupler moves the fixing member in a direction toward the base and when the base and the fixing member get into contact with each other, the first clamping section and the second clamping section clamp and fasten a roof longitudinal bar therebetween.

(2) When the first clamping section and the second clamping section according to the present invention clamp the roof longitudinal bar therebetween already, further rotation of the rod in the given direction would cause the bearing block to move toward the first stop section, so that the bearing block compresses the elastic element and the rib of the bearing block force the movable stop block to project out of a side of the extension coupler to tightly engage and fasten the coupling slot of the roof transverse bar.

(3) The present invention takes advantage of the rotation of the rod to adjust the tightness of the first clamping section and the second clamping section clamping and fastening the roof longitudinal bar and also takes advantage of the rotation of the rod to have the bearing block moved in such a manner to cause the movable stop block to project out of the side of the extension coupler so as to couple the extension coupler and the roof transverse bar.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A structure of a roof rack, comprising:
   a base, which has one side forming a first clamping section, the base having an opposite side forming a position-constraining member and two channels that are symmetric with respect to each other;
   a fixing member, the fixing member being mounted to the base and having one side forming a second clamping section and an opposite side forming two slide blocks respectively corresponding to the channels and slidably received in the channels, the second clamping section corresponding to and movable, together with the fixing member, with respect to the first clamping section;
   a rod, which has one end coupled to the position-constraining member and constrained in the base, the rod extending through and projecting outside the fixing member, the rod having an opposite end forming a thread and extending through an elastic element and a nut;
   an extension coupler, the extension coupler comprising a bearing block, at least one movable stop block, a first stop section, and a second stop section, the bearing block having a position-constraining hole formed therein, the bearing block and the nut being fit over the end of the rod that has the thread, the position-constraining hole receiving the nut therein, the bearing block movably bearing the movable stop block, the first stop section retaining the bearing block in position, the elastic element having two ends respectively supported on the second stop section and the bearing block; and
   a roof transverse bar, which is coupled to the base and the fixing member, the roof transverse bar having at least one coupling slot, the coupling slot corresponding to and coupled to the extension coupler, wherein when the rod is rotated in a given direction, the rod drives the nut to rotate and the nut drives the bearing block to move, whereby the bearing block is born by the elastic element and drives the extension coupler to move and the extension coupler drives the fixing member to move in a direction toward the base, so that when the fixing member gets into contact with the base, the rotation of the rod causes the bearing block to move toward the first stop section and the bearing block compresses the elastic element and forces the movable stop block to project out of a side of the extension coupler to tightly engage the coupling slot.

2. The structure of the roof rack as claimed in claim 1, wherein the bearing block further comprises a through hole, the through hole being coupled to the end of the rod that has the thread, the bearing block having one side forming at least one rib, whereby when the bearing block moves towards the first stop section, the rib drives the movable stop block to project out.

3. The structure of the roof rack as claimed in claim 1, wherein the elastic element is a spring.

4. The structure of the roof rack as claimed in claim 1, wherein the base further comprises a lock, the lock having an outer circumference to which a cover is mounted, whereby when the lock is coupled to the base, the cover shields the rod.

* * * * *